(12) United States Patent
Chuong

(10) Patent No.: US 11,434,827 B2
(45) Date of Patent: Sep. 6, 2022

(54) HYDROSTATIC SEAL WITH SECONDARY SEAL STRUCTURAL PROTECTION

(71) Applicant: United Technologies Corporation, Farmington, CT (US)

(72) Inventor: Conway Chuong, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 390 days.

(21) Appl. No.: 16/381,751

(22) Filed: Apr. 11, 2019

(65) Prior Publication Data

US 2020/0325825 A1 Oct. 15, 2020

(51) Int. Cl.
*F02C 7/28* (2006.01)
*F01D 11/00* (2006.01)
*F01D 11/02* (2006.01)
*F16J 15/44* (2006.01)
*F01D 11/16* (2006.01)

(52) U.S. Cl.
CPC .............. *F02C 7/28* (2013.01); *F01D 11/001* (2013.01); *F01D 11/02* (2013.01); *F01D 11/025* (2013.01); *F01D 11/16* (2013.01); *F16J 15/442* (2013.01); *F16J 15/445* (2013.01); *F05D 2240/53* (2013.01); *F05D 2240/55* (2013.01); *F16J 15/441* (2013.01)

(58) Field of Classification Search
CPC .......... F02C 7/28; F01D 11/001; F01D 11/02; F01D 5/02; F01D 11/025; F01D 11/16; F05D 2240/53; F05D 2240/55; F16J 15/442; F16J 15/445; F16J 15/441
See application file for complete search history.

(56) References Cited

U.S. PATENT DOCUMENTS

| | | | | |
|---|---|---|---|---|
| 7,896,352 B2* | 3/2011 | Justak | ................... | F16J 15/442 277/411 |
| 8,002,285 B2* | 8/2011 | Justak | ................... | F16J 15/442 277/412 |
| 8,172,232 B2* | 5/2012 | Justak | ................... | F16J 15/442 277/411 |
| 8,641,045 B2* | 2/2014 | Justak | ................... | F01D 11/025 277/412 |
| 8,919,781 B2* | 12/2014 | Justak | ................... | F16J 15/442 277/411 |
| 10,030,531 B2* | 7/2018 | Peters | ...................... | F01D 9/02 |

(Continued)

OTHER PUBLICATIONS

European Search Report for Application No. EP 20 15 6250; dated Sep. 3, 2020.

*Primary Examiner* — Eugene G Byrd
(74) *Attorney, Agent, or Firm* — Cantor Colburn LLP

(57) ABSTRACT

A hydrostatic seal assembly configured to be disposed between relatively rotatable components includes a base. The seal also includes a shoe operatively coupled to the base. The seal further includes a secondary seal disposed proximate an axially forward end of the shoe, the secondary seal extending radially from a radially inner end to a radially outer end to define a radial distance of the secondary seal, the secondary seal having an axially forward face. The seal yet further includes a structural component located adjacent to the axially forward face of the secondary seal and extending radially inwardly to cover at least half of the radial distance of the secondary seal.

18 Claims, 4 Drawing Sheets

(56) References Cited

U.S. PATENT DOCUMENTS

| | | | |
|---|---|---|---|
| 10,066,496 B2 * | 9/2018 | Schmitz | F01D 25/04 |
| 10,107,126 B2 | 10/2018 | Ackermann et al. | |
| 10,119,474 B2 | 11/2018 | Hyland et al. | |
| 10,161,259 B2 | 12/2018 | Gibson et al. | |
| 10,184,347 B1 * | 1/2019 | D'Ambruoso | F16J 15/447 |
| 10,190,431 B2 | 1/2019 | Bidkar et al. | |
| 2016/0130963 A1 * | 5/2016 | Wilson | F01D 11/025 |
| | | | 60/805 |
| 2018/0045066 A1 | 2/2018 | Chuong | |
| 2018/0058240 A1 * | 3/2018 | Chuong | F04D 29/083 |
| 2018/0363563 A1 * | 12/2018 | Gunderson | F02C 7/28 |
| 2020/0102846 A1 * | 4/2020 | DiFrancesco | F01D 11/025 |
| 2020/0157962 A1 * | 5/2020 | Chuong | F02C 7/28 |
| 2020/0248810 A1 * | 8/2020 | Virkler | F16J 15/442 |

\* cited by examiner

HYDROSTATIC SEAL WITH SECONDARY SEAL STRUCTURAL PROTECTION

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a hydrostatic seal assembly with structural protection for a secondary seal of the assembly.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe whose response is based on aerodynamic forces developed between the seal shoe and a rotor surface during operation. The hydrostatic seals include one or more secondary seals loaded axially against a spacer and the shoe. Proper functioning and positioning of the secondary seal(s) is dependent upon a positive pressure differential. If the hydrostatic seal is subject to a surge or pressure reversal, the thin secondary seal(s) may be subject to damage. For example, the secondary seal(s) may bend permanently in the upstream direction and no longer function properly. Additionally, even liberation of the secondary seal(s) is contemplated, thereby becoming debris. Traditional hydrostatic seal assemblies may not provide substantial structural protection for the above-described secondary seals.

BRIEF DESCRIPTION

Disclosed is a hydrostatic seal assembly configured to be disposed between relatively rotatable components. The seal includes a base. The seal also includes a shoe operatively coupled to the base. The seal further includes a secondary seal disposed proximate an axially forward end of the shoe, the secondary seal extending radially from a radially inner end to a radially outer end to define a radial distance of the secondary seal, the secondary seal having an axially forward face. The seal yet further includes a structural component located adjacent to the axially forward face of the secondary seal and extending radially inwardly to cover at least half of the radial distance of the secondary seal.

In addition to one or more of the features described above, or as an alternative, further embodiments may include that the structural component is a secondary seal cover.

In addition to one or more of the features described above, or as an alternative, further embodiments may include that the structural component is a spacer.

In addition to one or more of the features described above, or as an alternative, further embodiments may include that the spacer is a U-shaped component having an axially forward leg adjacent with the axially forward face of the secondary seal.

In addition to one or more of the features described above, or as an alternative, further embodiments may include that the structural component is a carrier that the base is operatively coupled to.

In addition to one or more of the features described above, or as an alternative, further embodiments may include a beam operatively coupling the shoe to the base.

In addition to one or more of the features described above, or as an alternative, further embodiments may include that the beam is one of a plurality of beams oriented parallel to each other.

In addition to one or more of the features described above, or as an alternative, further embodiments may include that the structural component includes at least one cutout portion.

In addition to one or more of the features described above, or as an alternative, further embodiments may include that the at least one cutout is an aperture.

In addition to one or more of the features described above, or as an alternative, further embodiments may include that the at least one cutout is a recess extending from a radially inner edge of the structural component.

In addition to one or more of the features described above, or as an alternative, further embodiments may include that the recess is a scalloped recess.

In addition to one or more of the features described above, or as an alternative, further embodiments may include that the relatively rotatable components are a stator and a rotor.

In addition to one or more of the features described above, or as an alternative, further embodiments may include that the seal is operatively coupled to the stator.

Also disclosed is a gas turbine engine that includes a compressor section, a combustor section, a turbine section, and a seal assembly disposed in the gas turbine engine, the seal assembly comprising a stator, a rotor, and a hydrostatic seal disposed between a stator and the rotor. The seal assembly includes a base. The seal assembly also includes a shoe operatively coupled to the base. The seal assembly further includes a secondary seal disposed proximate an axially forward end of the shoe, the secondary seal extending radially from a radially inner end to a radially outer end to define a radial distance of the secondary seal, the secondary seal having an axially forward face. The seal assembly yet further includes a structural component located adjacent to the axially forward face of the secondary seal and extending radially inwardly to cover at least half of the radial distance of the secondary seal.

In addition to one or more of the features described above, or as an alternative, further embodiments may include that the structural component is a secondary seal cover.

In addition to one or more of the features described above, or as an alternative, further embodiments may include that the structural component is a spacer.

In addition to one or more of the features described above, or as an alternative, further embodiments may include that the spacer is a U-shaped component having an axially forward leg adjacent with the axially forward face of the secondary seal.

In addition to one or more of the features described above, or as an alternative, further embodiments may include that the structural component is a carrier that the base is operatively coupled to.

In addition to one or more of the features described above, or as an alternative, further embodiments may include at least one beam operatively coupling the shoe to the base.

In addition to one or more of the features described above, or as an alternative, further embodiments may include that the structural component includes at least one cutout portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
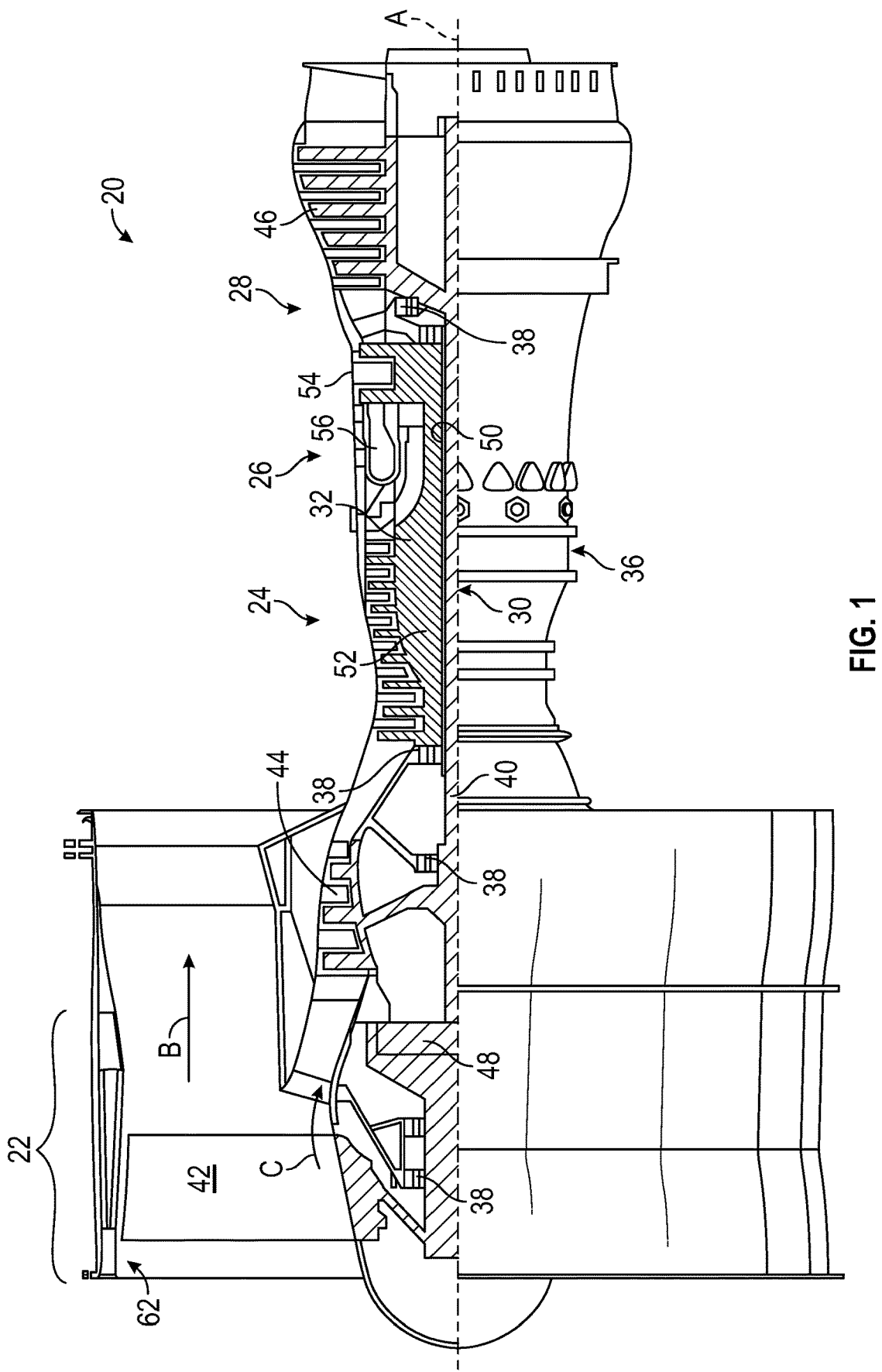
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
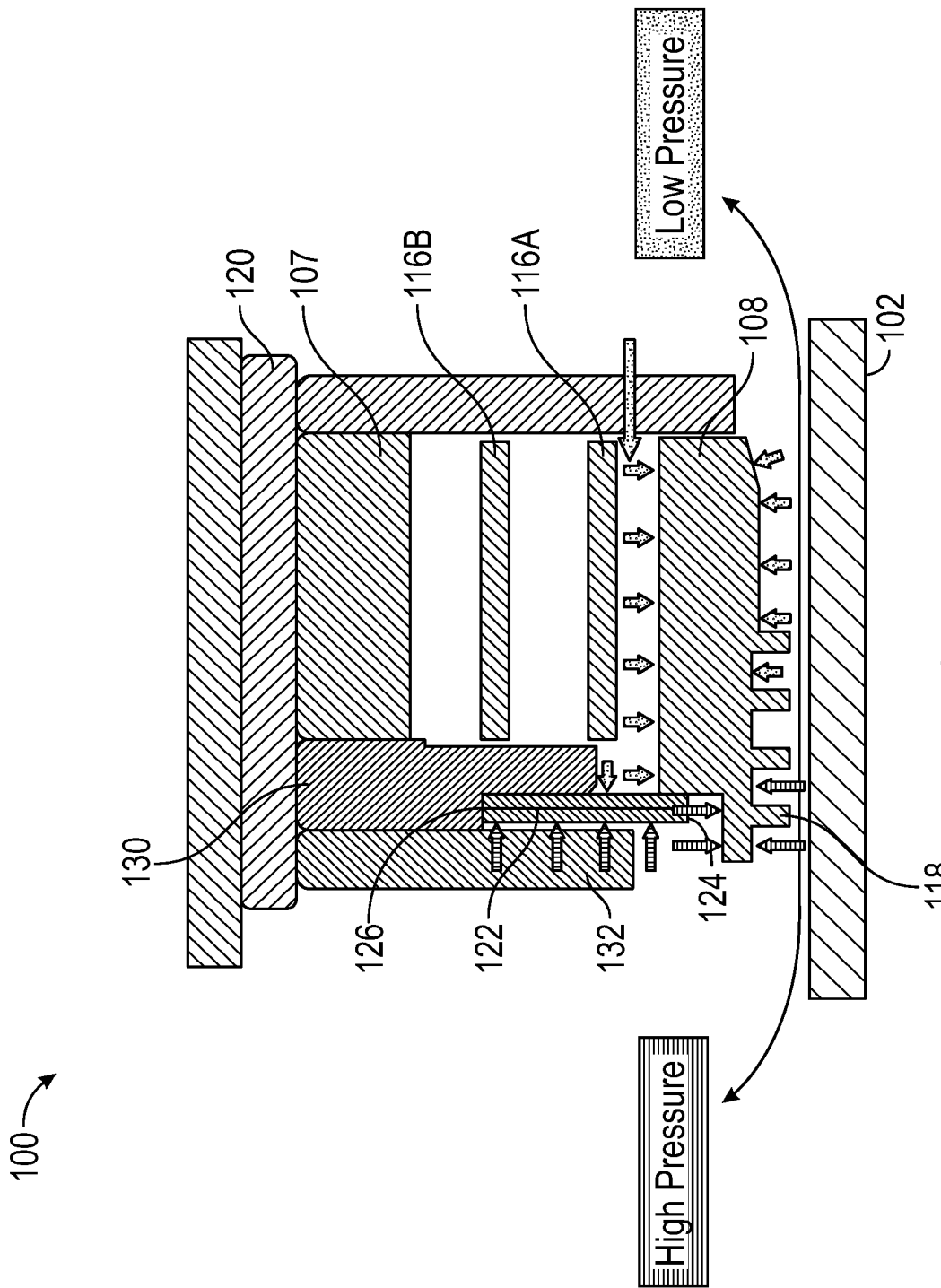
FIG. 2 is a sectional view of a hydrostatic seal assembly.
Figure 3:
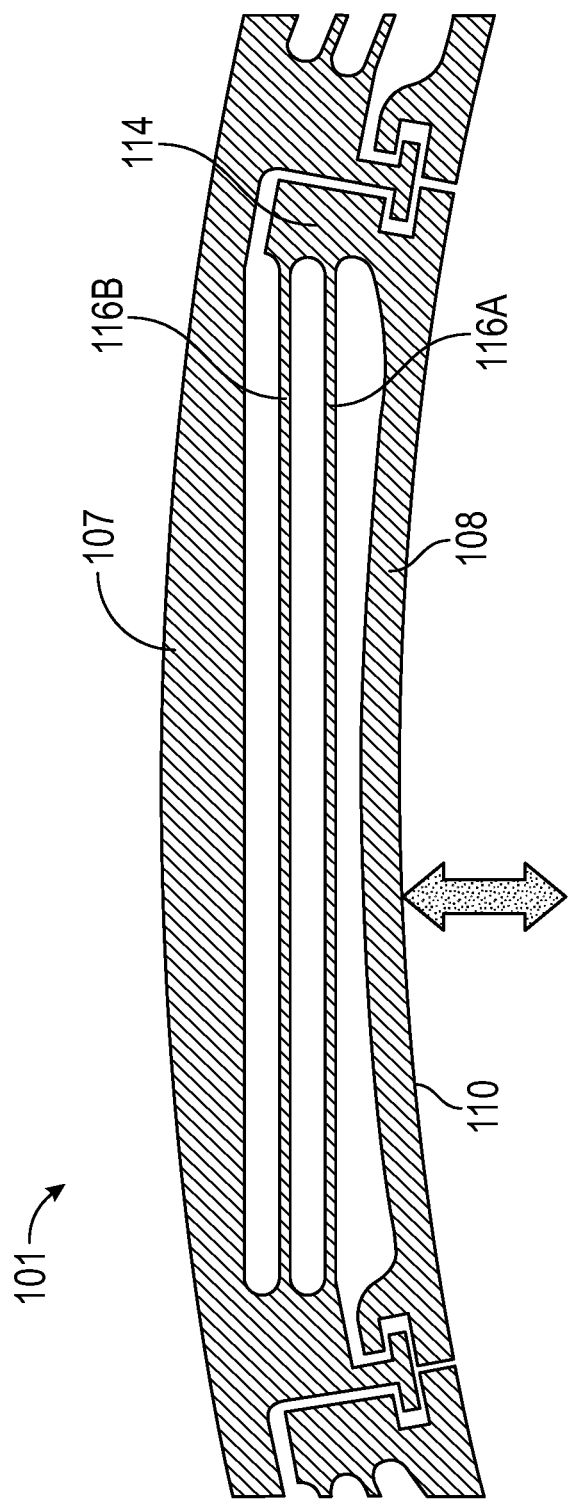
FIG. 3 is an elevational view of a portion of the hydrostatic seal assembly.

FIG. 2 illustrates a hydrostatic seal assembly indicated generally at 100. The hydrostatic seal assembly 100 is intended to create a seal between two relatively rotating components, such as a fixed stator and a rotating rotor 102. The hydrostatic seal assembly 100 includes a seal 101 (FIG. 3) that includes a base portion 107 and at least one, but often a plurality of circumferentially adjacent shoes 108 which are located in a non-contact position along the exterior surface of the rotor 102. Each shoe 108 is formed with a sealing surface 110. For purposes of the present disclosure, the term "axial" or "axially spaced" refers to a direction along the rotational axis of the rotor, whereas "radial" refers to a direction perpendicular to the rotational axis of the rotor.

Under some operating conditions, it is desirable to limit the extent of radial movement of the shoes 108 with respect to the rotor 102 to maintain tolerances, such as the spacing between the shoes 108 and the facing surface of the rotor. The hydrostatic seal assembly 100 includes at least one spring element 114. In the illustrated embodiment, each spring element 114 is formed with at least one beam though in practice other elements could be utilized to create the spring element. In the illustrated embodiment, two beams are shown, specifically an inner beam 116A and an outer beam 116B. The beams 116A, 116B connect the shoe 108 to the base portion 107 of the seal assembly 100. The base portion 107 is fixed to a carrier 120 that is part of a static structure.

Particularly when the hydrostatic seal assembly 100 is used in applications such as gas turbine engines, pressures are developed which apply an aerodynamic force to the shoe 108, which is counter-balanced by the spring 114, causing it to move radially with respect to the rotor 102. The initial assembly point has a defined radial gap between the shoe 108 and the rotating surface, with no aerodynamic forces acting upon the shoe 108. In operation, the hydrostatic seal assembly 100 is used to restrict flow between a high pressure region and a lower pressure region. To assist with the flow restriction, a plurality of teeth 118 are included on the sealing surface 110 of the shoe 108. The pressure drop across the shoe 108 results in a radial force on the shoe 108 which is counter balanced by the spring 114 with spring force. In operation, when the air flow between the shoe 108 and rotor 102 increases, the pressures on the shoe 108 generally decrease. The reduction in pressures along the shoe 108 reduces the radial force acting on the shoe 108 such that the force balance between the overall aerodynamic forces on the seal shoe and the spring force causes the shoe 108 to be pushed radially inwardly toward the rotor 102, thus decreasing the gap, until the seal reaches an equilibrium position considering the spring force of the displaced beam(s). Conversely, in operation, when the air flow between the shoe 108 and rotor 102 decreases, the pressures on the shoe 108 generally increase. The increase of radial force on the shoe 108, and its overall impact with the net aerodynamic forces on the seal shoe 108 considering the spring force, causes the shoe 108 to move radially outwardly from the rotor 102 until the seal reaches an equilibrium position considering the spring force of the displaced beam(s).

As shown in FIG. 2, a secondary seal 122 is provided proximate an axially forward end of the shoe 108. In the illustrated embodiment, a pair of axially stacked secondary seals are shown. It is to be appreciated that some embodiments are contemplated to include more secondary seals to define a secondary seal assembly or only one secondary seal. For purposes of descriptive brevity, a single secondary seal is described herein. The secondary seal 122 provides a seal between the illustrated high pressure region and the low pressure region in a space radially outward of the shoe 108. The secondary seal 122 extends from a radially inner end 124 to a radially outer end 126 to define a secondary seal radial distance. In the illustrated embodiment, a spacer 130 is located radially outward of the secondary seal 122 and axially rearward of the secondary seal 122. A secondary seal cover 132 is positioned axially forward of the secondary seal 122. The spacer 130 and the secondary seal cover 132 are positioned to allow the secondary seal 122 to be disposed therebetween.

In the illustrated embodiment of FIG. 2, the secondary seal cover 132 is the structural component that is located adjacent to the axially forward face of the secondary seal 122. The secondary seal cover 132 extends radially inwardly to an extent that provides structural support to the axially forward face of the secondary seal 122 in the event of a pressure reversal or any other condition that biases the secondary seal 122 in the axially forward direction. In some embodiments, the secondary seal cover 132 extends radially inward to cover more than half of the radial distance of the secondary seal 122. For example, the secondary seal cover 132 may extend radially inward to cover more than 50%, 60%, 70%, 80%, or 90% of the radial distance of the axially forward face of the secondary seal 122.

Figure 4:
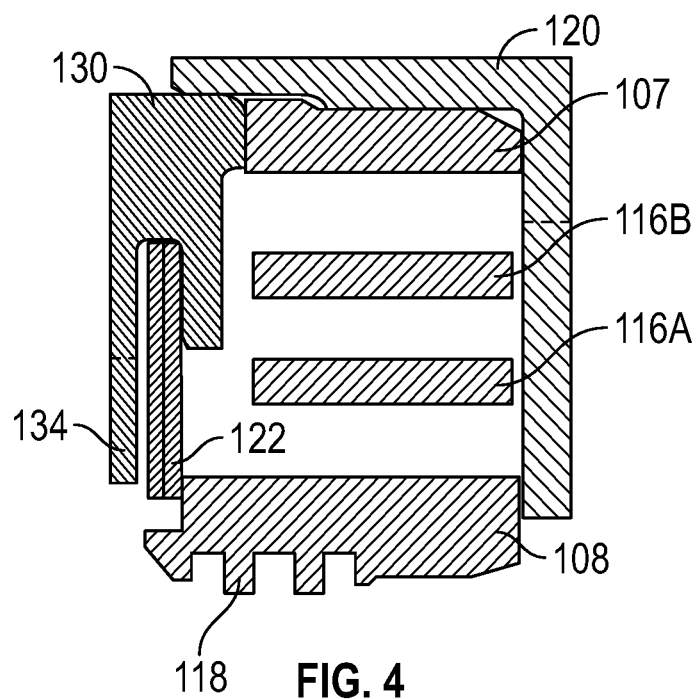
FIG. 4 is a sectional view of the hydrostatic seal assembly according to another aspect of the disclosure.
Figure 5:
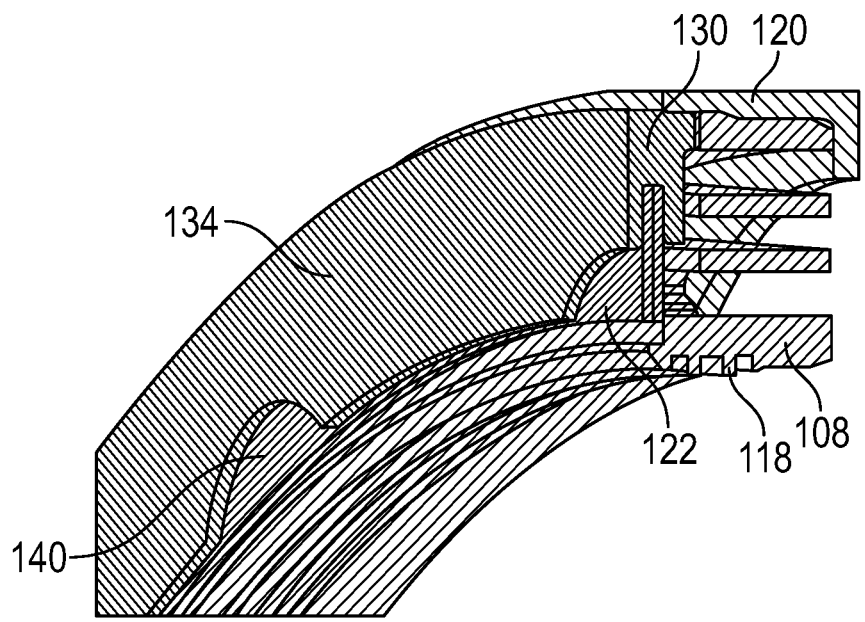
FIG. 5 is a perspective view of the hydrostatic seal assembly of FIG. 4.

Referring now to FIGS. 4 and 5, the spacer 130 is the structural component that is located adjacent to the axially forward face of the secondary seal 122. In particular, the spacer 130 in the illustrated embodiment is substantially U-shaped, with an axially forward leg 134 extending radially inwardly to an extent that provides structural support to the axially forward face of the secondary seal 122 in the event of a pressure reversal or any other condition that biases the secondary seal 122 in the axially forward direction. In some embodiments, the spacer 132 extends radially inward to cover more than half of the radial distance of the secondary seal 122. For example, the spacer 132 may extend radially inward to cover more than 50%, 60%, 70%, 80%, or 90% of the radial distance of the axially forward face of the secondary seal 122.

Although the spacer 130 and the secondary seal cover 132 are the structural components illustrated to cover more than half of the radial distance of the secondary seal 122, it is to be appreciated that alternative structural components may be employed to provide such support to the axially forward face of the secondary seal 122. For example, in some embodiments, the carrier 120 may include a leg or segment that extends radially inward to cover more than half of the axially forward face of the secondary seal 122.

The embodiments described herein includes one or more structural components that extend radially inwardly to cover a majority of the axially forward face of the secondary seal 122. Such structural reinforcement provides protection and retention against the secondary seal 122. Therefore, the secondary seal 122 is less prone to bending in the event of a pressure reversal due to the additional structural support and reinforcement.

As shown in FIG. 5, the spacer 130 in the illustrated embodiment and the secondary seal cover 132 of FIG. 2 may include apertures, recesses or scalloped sections that are collectively referred to herein as cutout portions 140. The cutout portions 140 provide additional exposed surface area of the axially forward face of the secondary seal 122 for exposure to the high pressure fluid. The cutout portions 140 are included in the structural feature to ensure a pressure differential that is sufficient for desirable overall seal assembly operation.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal assembly configured to be disposed between relatively rotatable components, the hydrostatic seal assembly, comprising:
    a base;
    a shoe operatively coupled to the base;
    a secondary seal disposed proximate an axially forward end of the shoe, the secondary seal extending radially from a radially inner end to a radially outer end to define a radial distance of the secondary seal, the secondary seal having an axially forward face; and
    a structural component located adjacent to the axially forward face of the secondary seal and extending radially inwardly to cover at least 90% of the radial distance of the secondary seal, wherein the structural component includes at least one cutout portion to provide additional exposed surface area of the axially forward face of the secondary seal.

2. The hydrostatic seal assembly of claim 1, wherein the structural component is a secondary seal cover.

3. The hydrostatic seal assembly of claim 1, wherein the structural component is a spacer.

4. The hydrostatic seal assembly of claim 3, wherein the spacer is a U-shaped component having an axially forward leg adjacent with the axially forward face of the secondary seal.

5. The hydrostatic seal assembly of claim 1, wherein the structural component is a carrier that the base is operatively coupled to.

6. The hydrostatic seal assembly of claim 1, further comprising a beam operatively coupling the shoe to the base.

7. The hydrostatic seal assembly of claim 6, wherein the beam is one of a plurality of beams oriented parallel to each other.

8. The hydrostatic seal assembly of claim 1, wherein the at least one cutout is an aperture.

9. The hydrostatic seal assembly of claim 1, wherein the at least one cutout portion is a recess extending from a radially inner edge of the structural component.

10. The hydrostatic seal assembly of claim 9, wherein the recess is a scalloped recess.

11. The hydrostatic seal assembly of claim 1, wherein the relatively rotatable components are a stator and a rotor.

12. The hydrostatic seal assembly of claim 11, wherein the hydrostatic seal assembly is operatively coupled to the stator.

13. A gas turbine engine comprising:
    a compressor section;
    a combustor section;
    a turbine section; and
    a seal assembly disposed in the gas turbine engine, the seal assembly comprising a stator, a rotor, and a hydrostatic seal disposed between a stator and the rotor, the seal assembly comprising:
    a base;
    a shoe operatively coupled to the base;
    a secondary seal disposed proximate an axially forward end of the shoe, the secondary seal extending radially from a radially inner end to a radially outer end to define a radial distance of the secondary seal, the secondary seal having an axially forward face; and
    a structural component located adjacent to the axially forward face of the secondary seal and extending radially inwardly to cover at least 90% of the radial distance of the secondary seal, wherein the structural component includes at least one cutout portion to provide additional exposed surface area of the axially forward face of the secondary seal.

14. The gas turbine engine of claim 13, wherein the structural component is a secondary seal cover.

15. The gas turbine engine of claim 13, wherein the structural component is a spacer.

16. The gas turbine engine of claim 15, wherein the spacer is a U-shaped component having an axially forward leg adjacent with the axially forward face of the secondary seal.

17. The gas turbine engine of claim 13, wherein the structural component is a carrier that the base is operatively coupled to.

18. The gas turbine engine of claim 13, further comprising at least one beam operatively coupling the shoe to the base.

* * * * *